June 4, 1929.  A. G. HENRICKS  1,715,656
STEERING GEAR
Filed Nov. 3, 1924
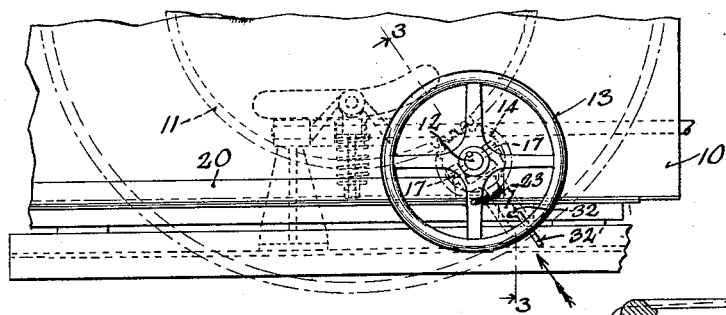
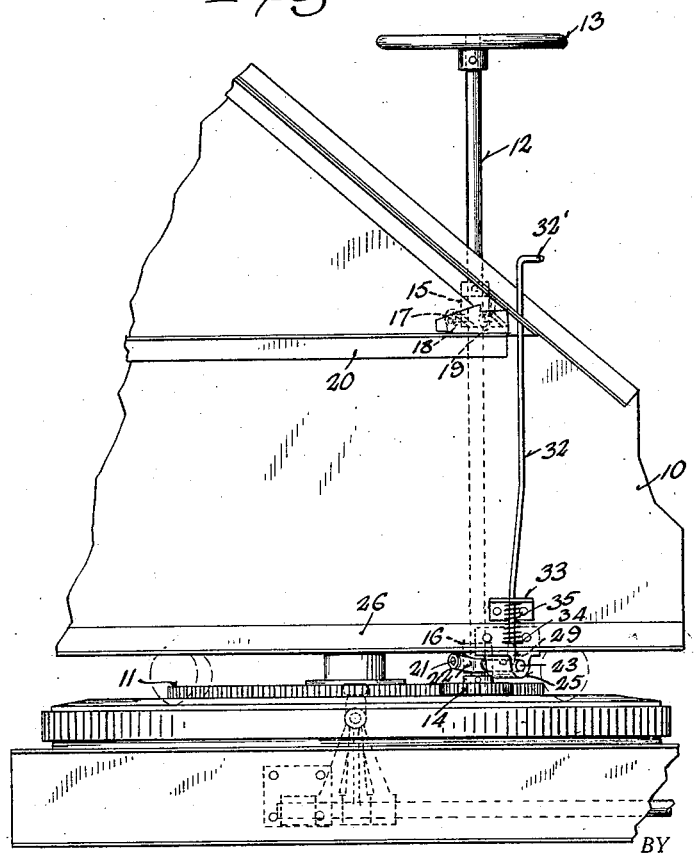
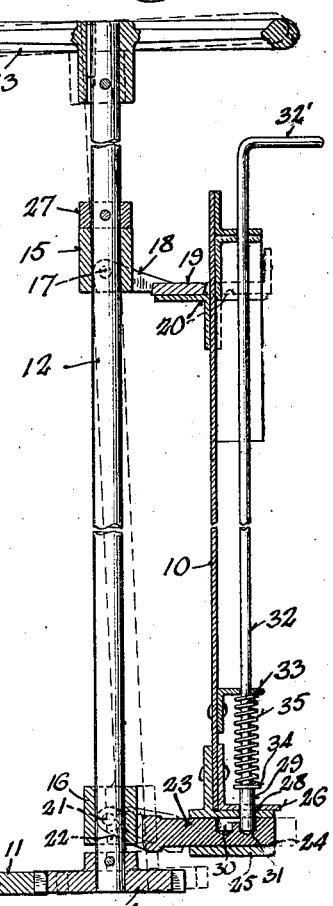
INVENTOR.
ARTHUR G. HENRICKS.
BY
Bottum, Hudnall, Lecher and McNamara.
ATTORNEYS.

Patented June 4, 1929.

1,715,656

UNITED STATES PATENT OFFICE.

ARTHUR G. HENRICKS, OF WAUWATOSA, WISCONSIN, ASSIGNOR TO HARNISCHFEGER CORPORATION, OF MILWAUKEE, WISCONSIN, A CORPORATION OF WISCONSIN.

STEERING GEAR.

Application filed November 3, 1924. Serial No. 747,406.

The present invention as in my prior co-pending application filed October 15, 1924, Serial No. 743,706, also relates to improvements in steering gear for motor driven vehicles of the type employing traction of the endless link belt type.

As explained in my prior application above identified the steering of machines of this character is usually accomplished by driving the traction members on opposite sides thereof at relatively different speeds or one independently of the other, and when, as is oftentimes the case, the body of the machine is mounted on a turn table above the traction members and the steering controlled through a shaft carried on the turn table and geared to the power transmitting mechanism therebeneath, it becomes desirable to provide some means of disconnecting the steering gear from said mechanism when the body is revolved so as to avoid the rapid rotation of the steering shaft which would otherwise result.

One object of the present invention is to provide steering gear disconnecting mechanism of the character described which shall be so constructed and arranged that the main steering shaft or operating element thereof may be utilized for controlling the engagement and disengagement of the pinion carried by said shaft with the power transmitting mechanism beneath the turn table.

Another object is to provide disconnecting mechanism of the character described which shall be extremely simple in construction and operation, positive in its action, and one which may be economically manufactured.

A further object of the invention resides in the mounting of the steering shaft in such wise that it may be oscillated on an axis transverse with respect to the longitudinal axis of said shaft to effect the engagement or disengagement of the pinion carried thereby with the power transmitting mechanism mounted on the traction frame.

Other objects and advantages will be apparent from the following description taken in connection with the accompanying drawings wherein one form of the invention is illustrated.

In the drawings—

Figure 1 is a top plan view of steering gear constructed in accordance with the present invention, said gear being shown operatively mounted on a machine of the character referred to;

Fig. 2 is a side elevation of a portion of a turn table body showing the present improvements applied thereto; and Fig. 3 is a vertical sectional view of the steering shaft and associated parts taken on the line 3—3 of Fig. 1.

Referring more in detail to the drawings, 10 designates a turn table body of any desired type mounted in any suitable manner for rotation about a vertical axis. The idler gear wheel is shown at 11 and is also mounted to turn about a vertical axis below the turn table, and as above described this idler in practice connects with the gearing and other elements not shown, through which the transmission of power is controlled in steering the vehicle.

The steering shaft is designated as 12 and is shown disposed vertically on the turn table and provided at its upper end with a hand wheel 13. A pinion 14 is mounted on the lower end of the shaft and is adapted as above described to mesh with the idler 11 in controlling the steering of the vehicle.

According to the present invention a mounting of the shaft 12 is contemplated which will permit the latter to be oscillated, rocked, or tilted on an axis transverse to its longitudinal axis in such wise that the pinion 14 may be moved through the arc of a circle towards and from the idler to effect its engagement or disengagement. With this end in view, it is proposed to journal shaft 12 in bearing members 15 and 16 movably supported in suitable manner upon the super-structure of the body, for instance, as shown in the drawings or in other suitable manner. Bearing member 15 is provided with oppositely directed trunnions 17 which engage in suitable openings provided in spaced-apart lugs 18 carried by bracket 19, which latter is shown in the drawings as mounted in fixed relation upon the upper angle bars 20 of the super-structure. The lower bearing member 16 is also provided with oppositely directed trunnions 21 and these engage in openings provided in the forked end 22 of a stud 23 which latter is slidably mounted in opening 24 of guide bracket 25. The guide bracket is shown in the drawings as being rigidly secured to the lower angle bar 26 of the super-structure. Thus, the upper bearing member 15 is pivotally mounted while the lower bearing member 16 is both pivotally and slidably mounted.

Shaft 12 is journaled in the bearing members 15 and 16 and is provided with a fixed collar 27 designed to rest down upon the upper edge of the bearing member 15 in order to support the shaft in proper position, or in other words, in such position that the pinion 14 carried thereby will be properly disposed with reference to the idler gear wheel.

The guide bracket 25 is provided with an opening 28 designed to receive a latch pin 29 adapted to engage in one or the other of sockets 30 and 31 provided in the stud 23 so that the latter may be held or locked in either of its positions of adjustment. The latch pin 29 is provided with an upwardly extending operating rod 32 slidably mounted through a bracket 33 and one of the angle bars of the super-structure, the upper end of said rod being suitably formed as at 32' to provide a hand grip. Interposed between a collar or washer 34, which rests down on the upper end of the latch pin 29 and the bracket 33, is a coiled spring 35 normally tending to urge the pin 29 downwardly into operative position. The pin is retracted or disengaged from the stud 23 by merely lifting the rod 32 as will be readily apparent.

The mounting of the shaft 12 is preferably such that the same assumes a vertical position when the pinion 14 is in operative engagement with the idler gear wheel 11, as shown in full lines in Fig. 3, for instance. When in this position latch pin 29 engages the rear socket 31 of the stud 23 and holds the parts in fixed relation and the pinion 14 against disengagement. When it is desired to rotate the body of the machine, it is merely necessary for the operator to raise the latch pin out of socket 31 whereupon the shaft 12 may be tilted to its dotted line position, as shown in Fig. 3, by merely moving the hand wheel 13 in the direction of the arrow in Fig. 1. In this position the pinion 14 is removed from engagement with the idler gear wheel, and latch pin 29 engages in the forward socket 30 of the stud and locks the parts in such position and against accidental displacement. During this operation it will be observed that the lower end of the shaft 12 is guided in its movement by the stud 23 which, as above described, is slidably mounted in the fixed bracket 25.

When it is desired to again reengage pinion 14 with the idler gear wheel, latch pin 29 is first disengaged from socket 30 and the hand wheel 13 is then moved back to its normal operative position, thus rocking shaft 12 to its vertical position and engaging the pinion and gear wheel. When in this position, latch 29 engages the socket 31 as previously described to lock the parts against displacement. After this operation the machine may be again steered in the usual manner. The simplicity in both construction and operation and the positiveness with which the operation is effected will be readily appreciated by those skilled in the art.

It will of course be appreciated that the shaft 12 might be mounted in different manner from that illustrated without departing from the principle of operation or the spirit of the invention. In other words, it is not desired to limit the invention to the particular construction or arrangement of parts illustrated as the embodiment shown has been selected merely for illustrative purposes and not in any way as defining or imposing limitations or restrictions upon the invention.

It is desired to call attention to the fact that in practice the position of the upper end of the steering shaft of the present improvements provides an indication as to whether or not the pinion is in or out of engagement with the idler. In other words, when the shaft is perpendicular and the hand wheel in a horizontal plane, the operator knows that the gears are in engagement, and when the shaft is angularly disposed it is an indication that the gears are out of engagement.

The invention claimed is:

1. In steering mechanism, a gear wheel, a shaft provided at one end with a pinion adapted to engage said gear wheel, means for supporting said shaft for rotation about its own axis and for tilting movement about an axis transverse to the shaft and substantially removed from said pinion whereby the shaft may be rocked to engage or disengage said pinion without materially changing the angular relation of the pinion and gear wheel, a single means on said shaft for rotating the shaft and also tilting the same and readily releasable means for locking the shaft against all tilting movement in either of its adjustments.

2. Steering mechanism of the class described comprising a rotatable and tiltable shaft, a pinion at one end of the shaft adapted to engage a gear wheel in one position of the shaft and to be disengaged in the other position of the shaft, operating means on the shaft remote from the pinion for rotating and tilting the shaft, guiding and holding means associated with the shaft adjacent the pinion, said guiding and holding means including relatively adjustable interfitting parts, and means controllable from a point adjacent the operating means and coacting with the interfitting parts for releasably locking the interfitting parts in position to cause the gear to be engaged with its pinion or in position to cause the gear to be disengaged from its pinion.

3. In steering mechanism of the class described, a plurality of supports, a bearing pivotally attached to one of said supports, a second bearing pivotally and slidably associated with the other of said supports, a shaft journaled in said bearings, a pinion mounted on said shaft near one end thereof adapted for engagement with a gear wheel, and a single means for rotating said shaft in said bearings and for rocking the same on a transverse axis coincident with the pivotal axis of said first-named bearing to engage or disengage said pinion.

4. In steering mechanism of the class described, a shaft, a pinion fixed to one end thereof and adapted to mesh with a gear wheel, a hand wheel fixed to the other end of said shaft, a plurality of bearing members for said shaft interposed between said pinion and said hand wheel, and supports for said bearing members, one of said supports being fixed and pivotally attached to one of said bearing members and the other of said supports being slidable and pivotally attached to the other of said bearing members whereby said shaft may be rocked on an axis coincident with the first pivot to engage and disengage said pinion and gear wheel.

5. In steering mechanism of the class described, a shaft, a pinion fixed to one end thereof and adapted to mesh with a gear wheel, a hand wheel fixed to the other end of said shaft, a plurality of bearing members for said shaft interposed between said pinion and said hand wheel, and supports for said bearing members, one of said supports being fixed and pivotally attached to one of said bearing members and the other of said supports being slidable and pivotally attached to the other of said bearing members whereby said shaft may be rocked on an axis coincident with the first pivot to engage and disengage said pinion and gear wheel, and means cooperating with said slidable support and operable from a point in close proximity to said hand wheel for locking said shaft in either position of adjustment.

6. In steering mechanism of the class described, a shaft, a pinion carried thereby and adapted for engagement with a gear wheel, a support, a bearing member pivotally carried by said support, a second support, a guide slidably mounted therein, a second bearing member pivotally carried by said guide at one end of the latter, said shaft being journaled in said bearing members and shiftable on a transverse axis coincident with the pivotal axis of said first-named bearing member to engage and disengage said pinion.

7. In steering mechanism of the class described, a shaft, a pinion carried thereby and adapted for engagement with a gear wheel, a support, a bearing member pivotally carried by said support, a second support, a guide slidably mounted therein, a second bearing member pivotally carried by said guide at one end of the latter, said shaft being journaled in said bearing members and shiftable on a transverse axis coincident with the pivotal axis of said first-named bearing member to engage and disengage said pinion, and means at the control of the operator and coacting with said guide for locking said shaft in either of its positions of adjustment.

8. In steering mechanism of the class described, a shaft, a pinion carried thereby and adapted for engagement with a gear wheel, a support, a bearing member pivotally carried by said support, a second support, a guide slidably mounted therein, a second bearing member pivotally carried by said guide at one end of the latter, said shaft being journaled in said bearing members and shiftable on a transverse axis coincident with the pivotal axis of said first-named bearing member to engage and disengage said pinion, and means at the control of the operator and coacting with said guide for locking said shaft in either of its positions of adjustment, said last-named means comprising a spring actuated latch pin mounted in an opening in said second bearing member support and engageable therethrough into sockets in said guide.

9. The combination with a steering shaft tiltably movable to operative and inoperative positions and a bearing member in which said shaft is journaled, of a sleeve mounted adjacent said bearing member, and a plunger pivotally attached to the latter and slidably engaging within said sleeve for guiding said shaft in its movements.

10. The combination with a steering shaft tiltably movable to operative and inoperative positions and a bearing member in which said shaft is journaled, of a sleeve mounted adjacent said bearing member, a plunger pivotally attached to the latter and slidably engaging within said sleeve for guiding said shaft in its movements, and means coacting with said sleeve and said plunger for positively locking said shaft in either position of adjustment against movement in either direction.

In witness whereof I hereto affix my signature.

ARTHUR G. HENRICKS.